(12) United States Patent
Dang (10) Patent No.: US 6,745,283 B1
(45) Date of Patent: Jun. 1, 2004

(54) DISK DRIVE FOR DYNAMICALLY ALLOCATING MEMORY ACCESSED CONCURRENTLY BY A HOST INTERFACE AND A DISK INTERFACE TO FACILITATE LARGE HOST COMMANDS

(75) Inventor: Quoc N. Dang, Brea, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 291 days.

(21) Appl. No.: 10/123,967

(22) Filed: Apr. 16, 2002

(51) Int. Cl.[7] .............................................. G06F 12/06
(52) U.S. Cl. ..................................... 711/113; 711/171
(58) Field of Search ................................ 711/113, 112, 711/114, 170, 171, 172; 707/200, 206

(56) References Cited

U.S. PATENT DOCUMENTS

| 3,596,257 | A | * | 7/1971 | Patel ............................ 711/171 |
| 5,053,945 | A | * | 10/1991 | Whisler ....................... 707/200 |
| 6,038,619 | A |   | 3/2000 | Berning et al. |
| 6,092,150 | A | * | 7/2000 | Sokolov et al. ............. 711/113 |
| 6,141,937 | A | * | 11/2000 | Dressler ..................... 52/742.1 |
| 6,684,393 | B1 | * | 1/2004 | Loen et al. ................. 707/206 |

* cited by examiner

Primary Examiner—Pierre Bataille
(74) Attorney, Agent, or Firm—Milad G. Shara, Esq.; Howard H. Sheerin, Esq.

(57) ABSTRACT

A disk drive is disclosed comprising a disk and a semiconductor memory comprising addressable locations for staging and caching data, wherein each addressable location having an allocation status. When a large write command is received from a host to write write-data to the disk, a disk controller dynamically allocates a plurality of the addressable locations relative to the size of the write command and the allocation status of the addressable locations. The write-data received from the host is stored in the dynamically allocated addressable locations while concurrently reading the write-data from the dynamically allocated addressable locations and writing the write-data to the disk. The dynamically allocated addressable locations are re-used for storing write-data received from the host after writing the write-data to the disk.

14 Claims, 5 Drawing Sheets

DISK DRIVE FOR DYNAMICALLY ALLOCATING MEMORY ACCESSED CONCURRENTLY BY A HOST INTERFACE AND A DISK INTERFACE TO FACILITATE LARGE HOST COMMANDS

CROSS REFERENCE TO RELATED APPLICATIONS AND PATENTS

This application is related to various patent applications including Ser. No. 09/552,404, now U.S. Pat. No. 6,553,457, entitled "TAG MEMORY DISK CACHE ARCHITECTURE" filed on Apr. 19, 2000, Ser. No. 09/552,399, now U.S. Pat. No. 6,601,137, entitled "RANGE-BASED CACHE CONTROL SYSTEM AND METHOD" filed on Apr. 19, 2000, Ser. No. 09/552,402 entitled "CACHE CONTROL SYSTEM AND METHOD HAVING HARDWARE-BASED TAG RECORD ALLOCATION" filed on Apr. 19, 2000, and Ser. No. 09/552,407, now U.S. Pat. No. 6,606,682, entitled "CLUSTER-BASED CACHE MEMORY ALLOCATION" filed on Apr. 19, 2000. The disclosures of the aforementioned patent applications are incorporated herein by reference.

BACKGROUND OF THE INVENTION

1. Field of the Invention

The present invention relates to disk drives for computer systems. More particularly, the present invention relates to a disk drive for dynamically allocating memory accessed concurrently by a host interface and a disk interface to facilitate large host commands.

2. Description of the Prior Art

Disk drives process commands received from a host to write data to and read data from a disk. A volatile semiconductor memory may be employed to stage write-data before being written to the disk as well as stage read-data before being transferred to the host. The semiconductor memory is also used as a cache memory which enhances the drive's operation since the cache memory is accessed much faster than the disk. The semiconductor memory is statically partitioned into a staging segment and a caching segment when the disk drive is configured during a power-on sequence. Consequently, the capacity of the staging segment is fixed leading to interruptions in host operations if the staging segment fills to capacity. The disk drive must wait until data is transferred out of the staging segment (to the disk or to the host) before the host operation can resume. This is undesirable since interrupting host operations degrades performance.

U.S. Pat. No. 6,038,619 discloses a disk drive employing a circular buffer for the staging segment which is accessed concurrently by a host interface process and a disk interface process. In this manner, the staging segment is filled and emptied concurrently during host operations which improves performance by effectively increasing the size of the staging segment. However, in the aforementioned patent the size of the circular buffer is static and may still overflow if the size of a host operation exceeds the latency of the disk and/or host interface.

There is, therefore, a need to improve the staging of data in a disk drive to help prevent interrupting a host's access to the disk drive.

SUMMARY OF THE INVENTION

The present invention may be regarded as a disk drive comprising a disk, a head actuated radially over the disk, and a semiconductor memory comprising addressable locations for staging and caching data, wherein each addressable location having an allocation status. The disk drive further comprises a disk controller which receives a write command from a host to write write-data to the disk, wherein the write-data comprises a first segment, a second segment and a third segment. The disk controller dynamically allocates a plurality of the addressable locations relative to the size of the write command and the allocation status of the addressable locations. The first segment of write-data is received from the host and stored in the dynamically allocated addressable locations. The second segment of write-data is received from the host and stored in the dynamically allocated addressable locations while concurrently reading the first segment of write-data from the dynamically allocated addressable locations and writing the first segment of write-data to the disk. The dynamically allocated addressable locations are re-used for storing the third segment of write-data received from the host after writing the first segment of write-data to the disk.

In one embodiment, the addressable locations are also used to stage read-data to facilitate read commands. The disk controller receives a read command from the host to read read-data from the disk, wherein the read-data comprises a first segment, a second segment and a third segment. The disk controller dynamically allocates a plurality of the addressable locations relative to the size of the read command and the allocation status of the addressable locations. The first segment of read-data is read from the disk and stored in the dynamically allocated addressable locations. The second segment of read-data is read from the disk and stored in the dynamically allocated addressable locations while concurrently reading the first segment of read-data from the dynamically allocated addressable locations and transmitting the first segment of read-data to the host. The dynamically allocated addressable locations are re-used for storing the third segment of read-data read from the disk after transmitting the first segment of read-data to the host.

In one embodiment, the allocation status is assigned a value selected from the group consisting of free, available, valid, and dirty. The free allocation status indicates an addressable location is not allocated, the available allocation status indicates an addressable location stores cached write-data written to the disk and therefore available for re-allocation, the valid allocation status indicates an addressable location stores cached read-data that can be selectively re-allocated, and the dirty allocation status indicates an addressable location stores staged write-data not yet written to the disk and therefore not available for re-allocation.

In one embodiment, the disk controller dynamically allocates addressable locations having a free allocation status first, dynamically allocates addressable locations having an available allocation status second, and dynamically allocates addressable locations having a valid allocation status third.

In one embodiment, before dynamically allocating all of the addressable locations having a valid allocation status, the disk controller writes at least part of the staged write-data to the disk, changes the corresponding addressable locations from a dirty allocation status to an available allocation status, and dynamically allocates the addressable locations updated to the available allocation status.

In one embodiment, when the disk controller dynamically allocates addressable locations having a valid allocation status, the disk controller selects the addressable locations storing the least recently used cached read-data.

In one embodiment, the number of addressable locations dynamically allocated by the disk controller increases with the number of addressable locations having a free allocation status and an available allocation status.

The present invention may also be regarded as a method of processing host commands in a disk drive. The disk drive comprises a disk, a head actuated radially over the disk, and a semiconductor memory comprising addressable locations for staging and caching data, wherein each addressable location having an allocation status. A write command is received from a host to write write-data to the disk, wherein the write-data comprises a first segment, a second segment and a third segment. A plurality of the addressable locations are dynamically allocated relative to the size of the write command and the allocation status of the addressable locations. The first segment of write-data received from the host is stored in the dynamically allocated addressable locations. The second segment of write-data received from the host is stored in the dynamically allocated addressable locations while concurrently reading the first segment of write-data from the dynamically allocated addressable locations and writing the first segment of write-data to the disk. The dynamically allocated addressable locations are re-used for storing the third segment of write-data received from the host after writing the first segment of write-data to the disk.

DESCRIPTION OF THE PREFERRED EMBODIMENTS

Figures 1A, 1B:
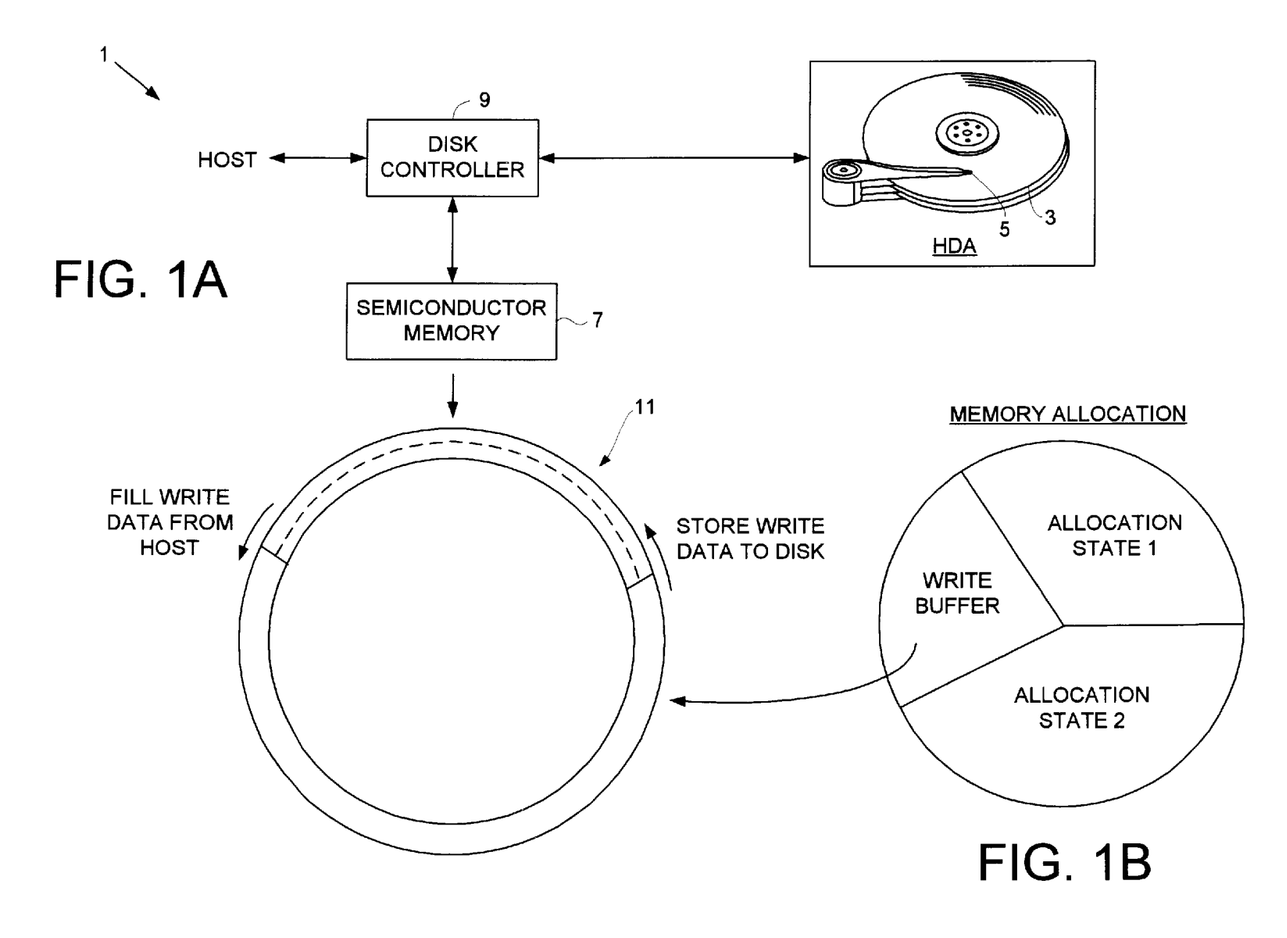
FIGS. 1A and 1B illustrates a disk drive according to an embodiment of the present invention wherein a write buffer is dynamically allocated relative to an allocation status of semiconductor memory to facilitate large write commands in an efficient manner.

FIG. 1A shows a disk drive 1 according to an embodiment of the present invention comprising a disk 3 a head 5 actuated radially over the disk 3 (in a head disk assembly (HDA)), and a semiconductor memory 7 comprising addressable locations for staging and caching data, wherein each addressable location is assigned an allocation status. The disk drive 1 further comprises a disk controller 9 for receiving a write command from a host to write write-data to the disk 3, wherein the write-data comprises a first segment, a second segment and a third segment. The disk controller 9 dynamically allocates a plurality of the addressable locations 11 relative to the size of the write command and the allocation status of the addressable locations as illustrated in FIG. 1B. The first segment of write-data received from the host is stored in the dynamically allocated addressable locations 11. The second segment of write-data received from the host is stored in the dynamically allocated addressable locations 11 while concurrently reading the first segment of write-data from the dynamically allocated addressable locations 11 and writing the first segment of write-data to the disk 3. The dynamically allocated addressable locations 11 are re-used for storing the third segment of write-data received from the host after writing the first segment of write-data to the disk 3.

In one embodiment, the addressable locations are also used to stage read-data to facilitate read commands. The disk controller 9 receives a read command from the host to read read-data from the disk, wherein the read-data comprises a first segment, a second segment and a third segment. The disk controller 9 dynamically allocates a plurality of the addressable locations relative to the size of the read command and the allocation status of the addressable locations. The first segment of read-data is stored in the dynamically allocated addressable locations 11. The second segment of read-data read from the disk 3 is stored in the dynamically allocated addressable locations 11 while concurrently reading the first segment of read-data from the dynamically allocated addressable locations 11 and transmitting the first segment of read-data to the host. The dynamically allocated addressable locations are re-used for storing the third segment of read-data read from the disk 3 after transmitting the first segment of read-data to the host.

In the embodiment shown in FIG. 1A, the addressable locations 11 are dynamically allocated as a contiguous circular buffer wherein during write operations write-data received from the host is stored at the head of the circular buffer and write-data written to the disk is taken from the end of the circular buffer. Eventually the head of the circular buffer will wrap around to the end so that the addressable locations are re-used to process the write command. This facilitates large write commands in a memory efficient manner which helps maintain performance for other memory intensive functions, such as data caching. In addition, the size of the write buffer is selected dynamically relative to the allocation status of the semiconductor memory 7 in order to optimize performance. For example, in one embodiment the size of the write buffer is increased if there is a large number of free (unallocated) addressable locations at the time the write command is received from the host. The size of the write buffer decreases as the number of addressable locations allocated for other operations increases, such as allocations for data caching. These memory optimization features also improve performance when processing large read commands.

Any suitable memory structure may be employed other than the circular buffer 11 shown in the embodiment of FIG. 1A. In an embodiment disclosed below, the addressable locations are dynamically allocated in a non-contiguous sequence and re-used in any suitable manner as compared to the "first-in first-out" processing of a circular buffer. In addition, the disk controller 9 may comprise any suitable circuitry implemented in one or more integrated circuits.

Figure 2:
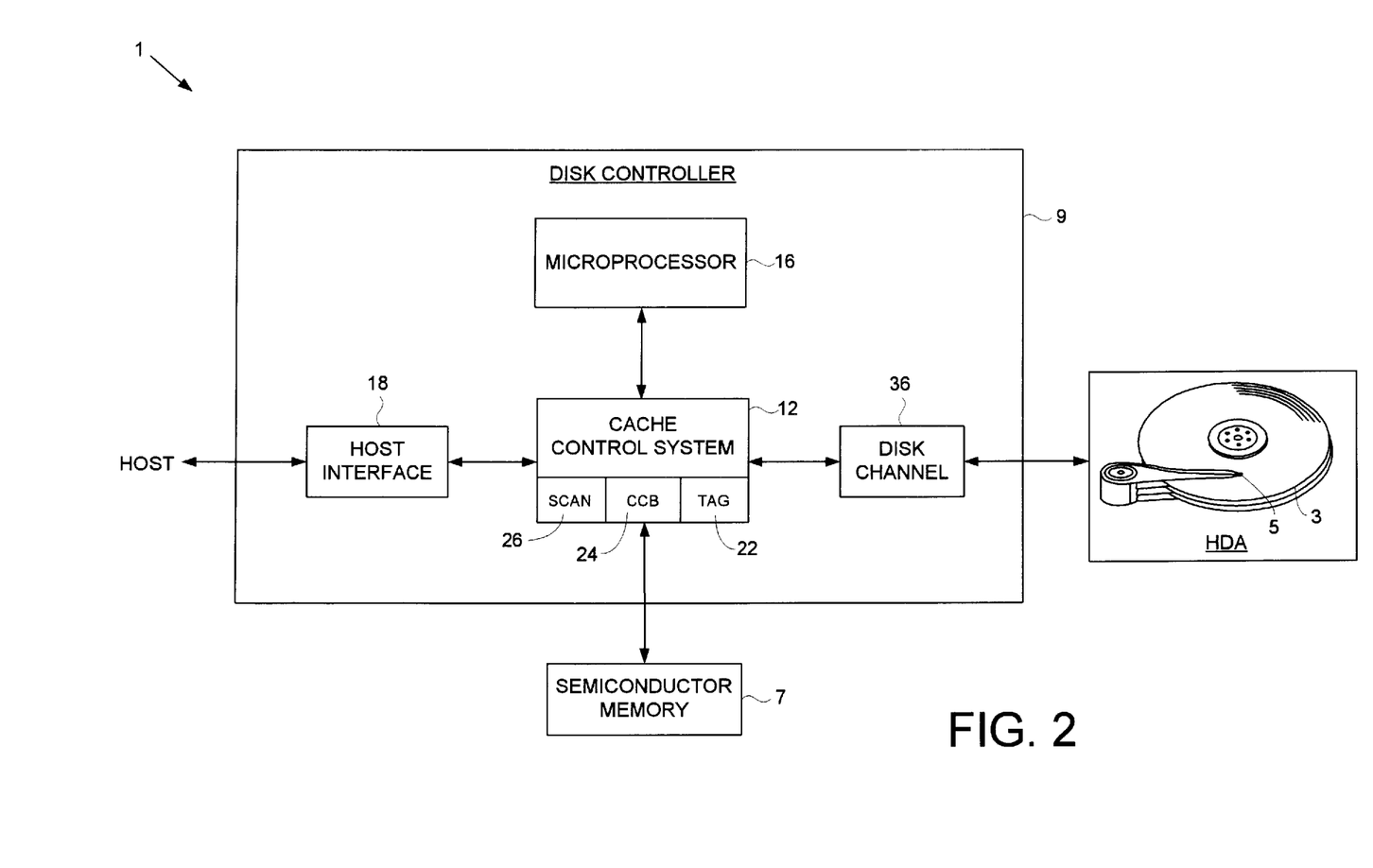
FIG. 2 shows a disk drive according to an embodiment of the present invention wherein the disk controller comprises a microprocessor, a host interface, a cache control system, and a disk channel.

FIG. 2 shows details of a disk controller 9 according to an embodiment of the present invention comprising a cache control system 12, a microprocessor 16, and a host interface 18. The host interface 18 receives host commands from a host, such as a personal computer, and transfers disk data between the disk drive 1 and the host. The host commands identify the disk data using a start logical block address (LBA) and a count specifying the number of sectors to be transferred. The semiconductor memory 7 caches the disk data under the direction of the cache control system 12 and the microprocessor 16. The microprocessor 16 operates under firmware control and manages the operation of the disk drive 1 and assists hardware elements under specific conditions. The semiconductor memory 7 is random access memory, typically 2 megabytes (MB). Generally, the larger the semiconductor memory 7, the better the performance of the disk drive 1 in responding to host commands. The cache control system 12 includes a scan processor 26, a tag (random access) memory (RAM) 22, and a cluster control block (CCB) memory 24, the details of which are described below.

The disk controller 9 also includes a disk channel 36 for interfacing with the HDA. The disk 3 is organized into sectors, typically of 512 bytes plus redundancy bytes for error correction, which are individually addressable using a logical block address (LBA). The disk channel 36 performs conventional encoding and decoding of data written to and read from the disk 3.

Figure 3:
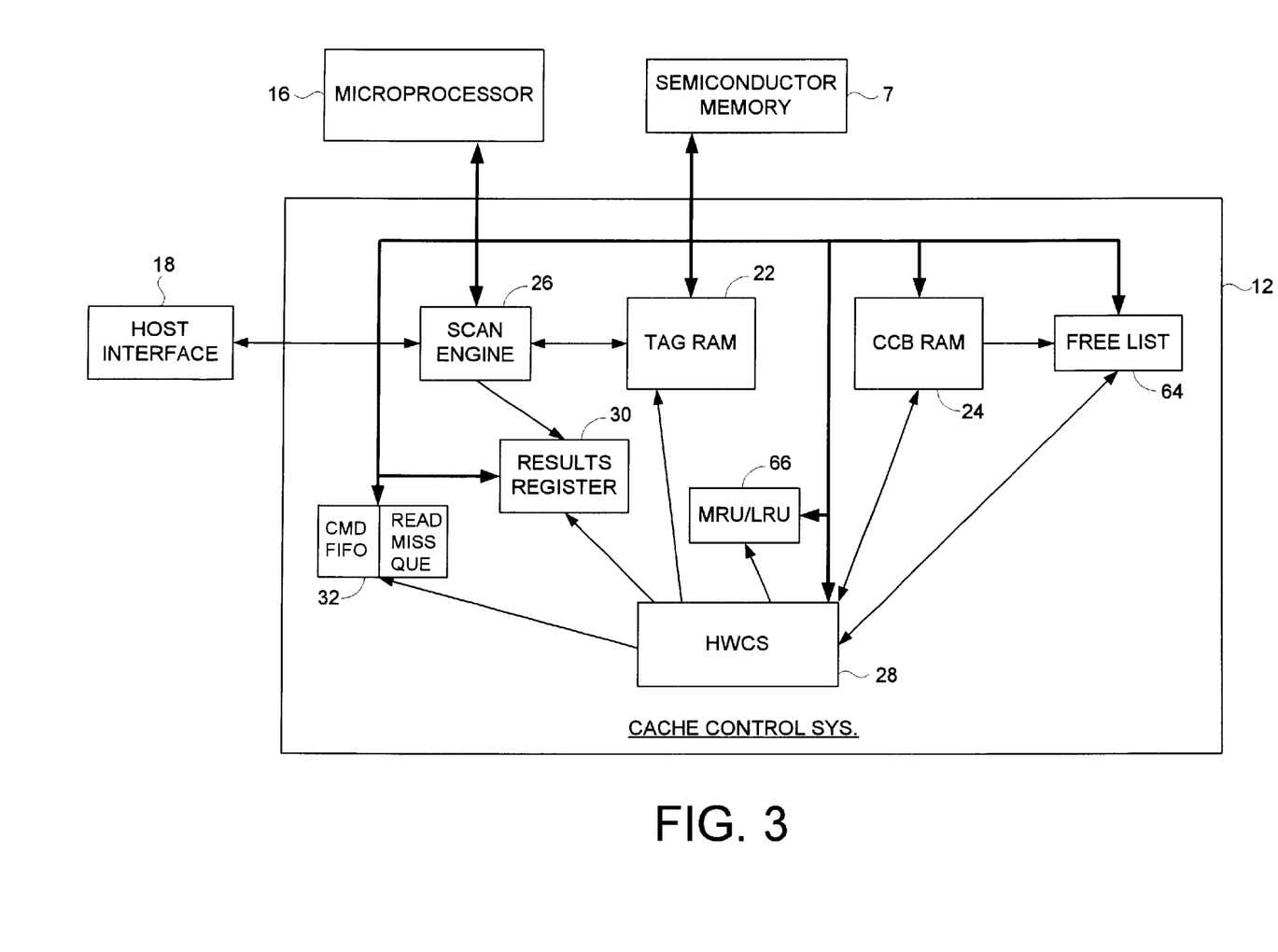
FIG. 3 shows details of the cache control system of FIG. 2 according to an embodiment of the present invention.

The cache control system 12 is shown in more detail in FIG. 3. The cache control system 12 includes the tag memory 22 and the CCB memory 24. The tag memory 22 is a static random access memory (SRAM) structure which is preferably embedded in an integrated controller chip having a table of tag or segment records. The embedded tag memory 22 thus provides higher performance and lower cost versus firmware based cache control schemes which use a general purpose external RAM. In particular since internal hardware engines, as described further below, may access the tag records in parallel with and independently from microprocessor 16, the cache control system 12 enables higher performance by off-loading microprocessor 16 and providing hardware based processing as detailed below. The CCB memory 24 is also preferably an embedded SRAM having a plurality of records or CCBs (cluster control blocks) 34.

The tag memory 22 may be accessed by the microprocessor 16, a scan engine 26 and a host writable control store (HWCS) 28, and may be updated by the microprocessor 16 and the HWCS 28. The scan engine 26 is coupled to the host interface 18 and receives host commands and scans the tag memory 22 for the LBA ranges associated with a host command. The scan engine 26 places the scan results in a results register 30 or, if servicing the host command further requires intervention by the microprocessor 16, the HWCS 28 places the command in a command queue 32. The command queue 32 has a read miss queue and a write command first-in first-out (FIFO) queue. The scan engine 26 is described in more detail in the above-referenced U.S. Application titled RANGE-BASED CACHE CONTROL SYSTEM AND METHOD. If a host command may be responded to by the cached data referenced in the tag memory 22, then the HWCS 28 manages the response to the host command, otherwise the microprocessor 16 may assist with the response. Thus, the HWCS 28 off-loads cache tasks from the microprocessor 16 enabling response to host commands for data already in the semiconductor memory 7 without microprocessor intervention.

The tag memory 22 is described in more detail with reference to FIG. 4. The tag memory 22 has a plurality of tag records 40 that define segments (e.g., 42 and 44) of memory clusters 46 within the semiconductor memory 7. Typically, the tag memory 22 may have 32 or 64 records dedicated to defining variable length segments. Other tag memory records (not shown) may be dedicated to single block transfers for caching small data elements stored within one memory cluster 46 that are repeatedly accessed by the host 20. The semiconductor memory 7 is divided into 512 byte blocks or sectors 48. Each cache sector 48 is for storing disk data of a 512-byte disk sector. Note that if the number of bytes in a disk sector is defined to have, for example, 1024 bytes the number of bytes in a cache sector 48 is similarly defined to have 1024 bytes. The cache sectors 48 are bunched into consecutively numbered groups or clusters. Each cluster 46 has a particular cluster number. Preferably, each cluster 46 has 16 cache sectors 48, although the number of sectors 48 in each cluster 46 may be selected based on the size of the semiconductor memory 7, the size of the CCB SRAM 24, and the operational characteristics of the host.

The tag memory 22 defines the segments of the cache memory clusters 46 using the CCBs 34. The number of CCBs 34 equals the number of clusters 46 with each CCB 34 having the same identification number as the corresponding cluster 46. Each tag record 40 has entries or fields (50, 52, 54, 56, 58 and 60) for indicating the first disk LBA assigned to the corresponding segment, the number of valid sectors in the segment, the number of sectors allocated to the segment, the first segment CCB, the last segment CCB, and state and control flags for the segment. Each CCB has a pointer 62 to a next CCB in a segment or to indicate that the CCB is the last CCB in the segment. Accordingly, a tag record 40 defines a segment by recording the segment's first CCB in the first CCB entry 56. The first CCB 34 has a pointer 62 to the next or second CCB in the segment. The second CCB likewise has a pointer 62 to the next CCB until the last CCB in the segment. The last CCB has an indicator such as a null value that indicates the end of the segment. The null value may be selected to be zero in which case the CCB and cluster number 0 is not used. Alternatively, the allocated count entry 54 may be used in indicating the end of the segment by counting the number of CCBs in the segment.

A segment that is assigned to a tag record 40 may have any length up to the total number of available CCBs 34. It is possible (although unlikely) that the entire semiconductor memory 7 may be assigned to one segment.

Figure 4:
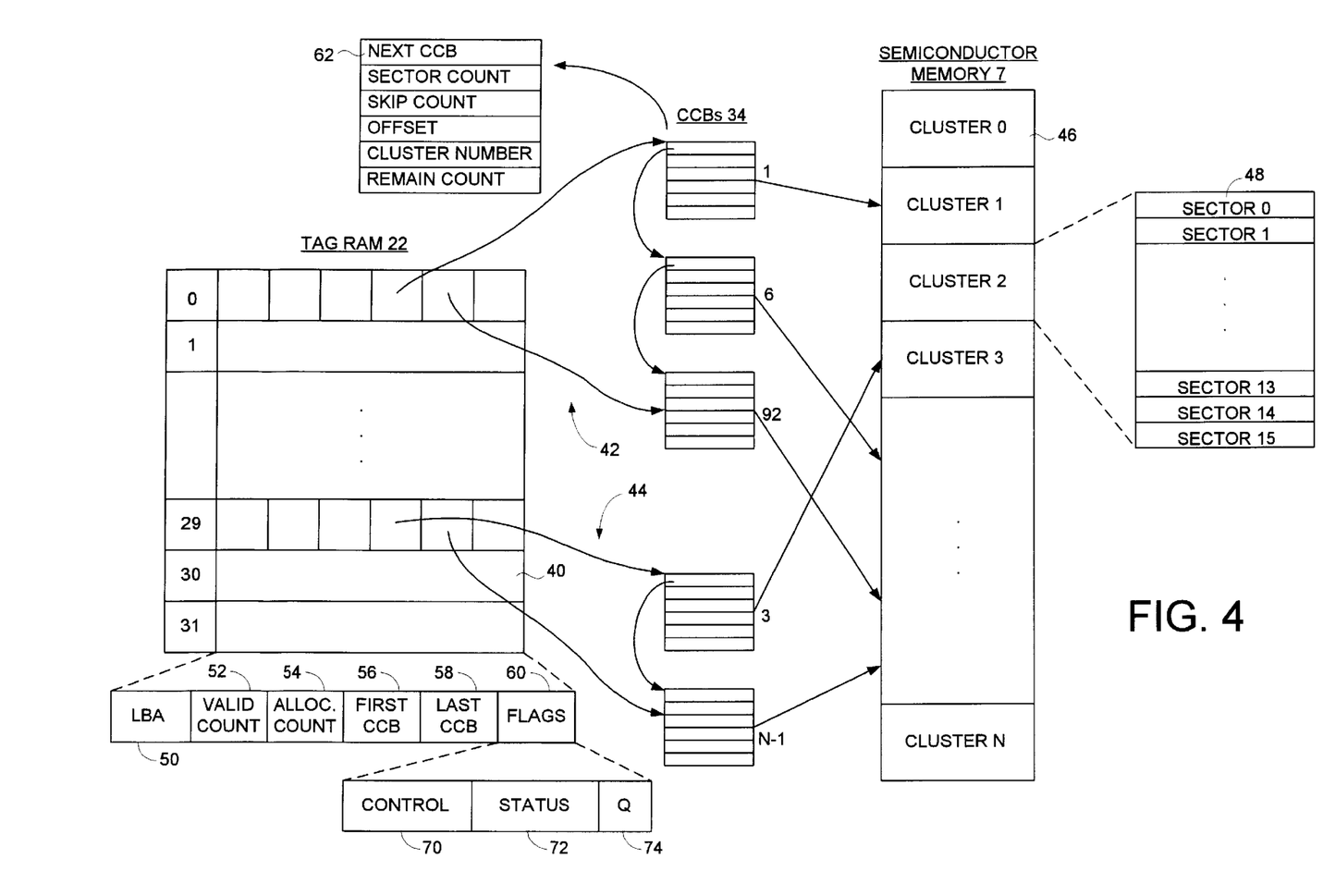
FIG. 4 illustrates the data structures employed by the cache control system of FIG. 3 according to an embodiment of the present invention.

Two short exemplary segments, 42 and 44, are shown in FIG. 4. The first segment 42 is formed by three clusters 46. The first tag record number 0 has a first segment CCB entry 56 pointing to the CCB number 1, which CCB is associated with the cluster number 1. The CCB number 1 points to the CCB number 6, which CCB is associated with cluster number 6. The CCB number 6 points to the CCB number 92, which CCB is associated with the cluster number 92. The CCB number 92 has a null value in its next cluster pointer indicating the end of the segment 42. The first tag record 40 also has an entry 58 pointing to the last segment CCB, which in this case is CCB number 92.

The second segment 44 is defined by the tag record number 29 to have a length of two clusters 46. The first cluster 46 of the segment 44 is the cluster number 3 and the second and last cluster of the segment 44 is the cluster number N−1. Accordingly, the tag record number 29 has a first segment CCB entry 56 pointing to CCB number 3 and a last segment CCB entry 58 pointing to CCB number N−1. The cluster number 3 points to the cluster number N−1, and the cluster number N−1 has a null value in its pointer.

The length of a segment may be extended by changing the last CCB 34 of the segment to point to a next added CCB, and by updating the allocated count entry 54 and the last segment CCB entry 58 in the tag record 40. The tag record pointer entries, 56 and 58, in conjunction with the CCB pointers 62, allow definition of variable length segments without regard to the logical or numerical order of the clusters 46 in the semiconductor memory 7. Accordingly, the tag memory 22 provides a flexible and powerful data staging and caching technique for efficiently responding to host commands.

The cache control system 12 (FIG. 3) also includes a free list 64 and a most-recently-used/least-recently-used (MRU/LRU) engine 66. The free list 64 tracks any CCBs 34 not assigned to a tag record 40. Accordingly, all CCBs 34 are assigned to either a tag record 40 or to the free list 64. The CCBs 34 and the free list 64 are described in more detail in the above-referenced U.S. Application titled CLUSTER-BASED CACHE MEMORY ALLOCATION. The MRU/LRU engine 66 keeps track of the currency of the cached data associated with each tag record 40 in the tag memory and is described in more detail in above-referenced U.S. Application titled CACHE CONTROL SYSTEM AND METHOD HAVING HARDWARE-BASED TAG RECORD ALLOCATION.

The preferred data structure of the entries in the tag records 40 is now described. The first entry 50 in a tag record 40 is a 32-bit address representing the first logical block address of the segment being defined by the tag record 40. The next entry 52 in the tag record 40 is a 10-bit valid count representing the number of valid sectors in the segment. When a data read ahead is performed, the valid count represents the valid data sectors put into the semiconductor memory 7. When data sectors are being written, the HWCS 28 will update the valid count as data is written to semiconductor memory 7. The next entry 54 in the tag record is a 10-bit allocated count representing the number of cache sectors 48 allocated to the segment. The allocated count is generally equal to the valid count at command completion when a command is prematurely aborted. In any event, the valid count is never greater than the allocated count. The next entry 56 in the tag record 40 is an 8-bit first segment CCB pointer to the first CCB 34 used in the segment. The next entry 58 in the tag record 40 is an 8-bit last segment CCB pointer. The next entry 60 in the tag record 40 is a series of status and control flags for use by the scan engine 26, the microprocessor 16 and the HWCS 28. Among other things, the status and control flags are used for managing tag record allocations and transfers of data between the memory clusters 46 and the host 20, and between the memory clusters 46 and the disk 3.

The status and control flag entry 60 includes a 2-bit control flag 70, a 2-bit status flag 72, and a 1-bit Q scan flag 74. The control flag 70 indicates ownership of the tag record 40. Ownership of a tag record may be maintained by the microprocessor 20, the HWCS 28, or the scan engine 26. The status flag 72 indicates the allocation status of the disk data stored in the memory clusters 46 associated with the tag record 40. The allocation status may be free, available, valid, or dirty. The free allocation status indicates that no valid data is associated with the tag record 40, that is, the memory cluster 46 is not allocated. The available allocation status indicates that valid data is associated with the tag record 40, such as cached write-data written to the disk, and the data may be discarded and the tag record 40 re-used. The valid allocation status indicates that valid data is stored in the memory clusters 46 of the segment defined by the tag record, such as cached read-data that can be selectively re-allocated. The dirty allocation status indicates a segment of memory clusters 46 having valid write-data that has not been written to the disk 3. All host write-data is marked as dirty when it is transferred into the semiconductor memory 7 by the HWCS 28. The Q scan flag 74 is used during a review of the tag records 40 by the MRU/LRU engine 66.

In one embodiment, The disk controller 9 dynamically allocates addressable locations having a free allocation status first, dynamically allocates addressable locations having an available allocation status second, and dynamically allocates addressable locations having a valid allocation status third. In one embodiment, before dynamically allocating all of the addressable locations having a valid allocation status, the disk controller 9 writes at least part of the staged write-data to the disk 3, changes the corresponding addressable locations from a dirty allocation status to an available allocation status, and dynamically allocates the addressable locations updated to the available allocation status. In this manner at least part of the read cache is preserved to avoid degrading performance. In another embodiment when the disk controller 9 dynamically allocates the addressable locations having a valid allocation status, the disk controller 9 selects the addressable locations storing the least recently used (LRU) cached read-data. This improves performance with respect to the read cache since the LRU cached read-data is the least likely to be requested by the host during a subsequent read operation. In one embodiment, the number of addressable locations dynamically allocated by the disk controller 9 for a read or write command increases with the number of addressable locations having a free allocation status and an available allocation status.

Figure 5:
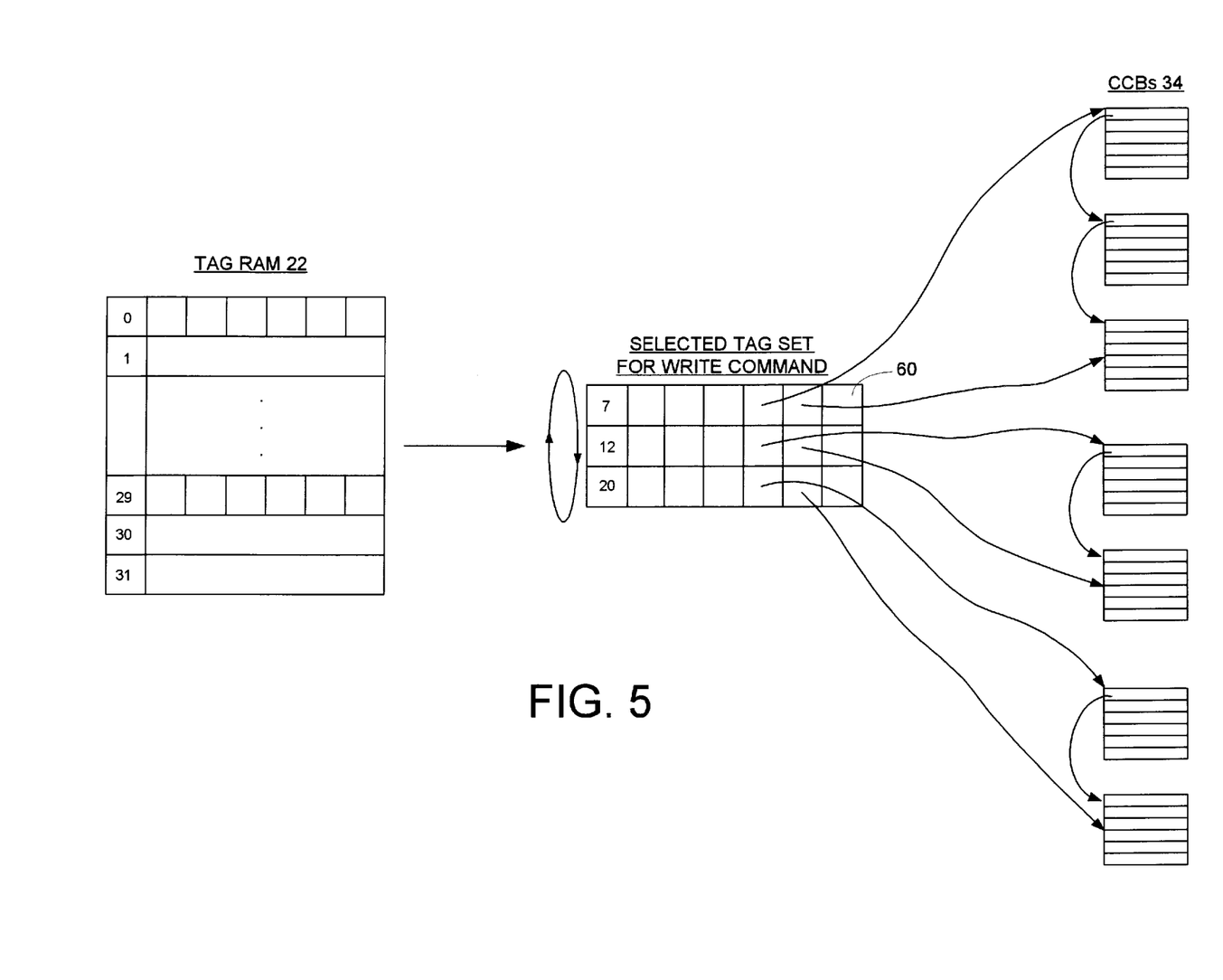
FIG. 5 shows an embodiment of the present invention wherein a set of tag records is selected for servicing a large write command, wherein the tag records are re-used to facilitate concurrent transfer of write-data from the host while writing the write-data to the disk.

FIG. 5 illustrates an embodiment of the present invention wherein a set of tags are selected from the tag RAM 22 in order to service a large write command received from the host. The tags selected to service the write command may have been constructed previously and simply re-used, or they may be constructed or modified on-the-fly by assigning an appropriate sequence of CCBs 34. In any event, the capacity of the CCBs 34 associated with the tags is preferably as large as possible relative to the allocation status of the semiconductor memory 7 (as determined by the status of the flags 60 in each tag) but still smaller than the size of the write command so that the CCBs 34 are re-used in an efficient manner (i.e., "just in time").

In the embodiment shown in FIG. 5, the tags numbered 7, 12 and 20 are selected to service a large write command. Also in the embodiment shown, the selected tags are processed in a circular sequence, receiving write-data from the host and writing the write-data to the disk 3. However, the tags may be processed in any suitable sequence, including a sequence selected by a rotational position optimization (RPO) algorithm. During the write operation, the flags 60 indicate the status and ownership of each tag. While the host interface 18 (FIG. 2) is filling the first tag (e.g., tag 7) with write-data, the disk channel 36 will not attempt to process the tag. Once the tag is filled with write-data, the flags 60 are updated so that the disk channel 36 will process the tag to write the write-data to the disk 3. Concurrent with writing the write-data to the disk 3, the next tag (e.g., tag 12) is filled with write-data received from the host, followed by the next tag (e.g., tag 20). Before filling a tag with write-data, the host interface 18 checks the flags 60 to verify that the disk channel 36 has finished writing the write-data to the disk 3, that is, to verify the tag is ready to receive more write-data from the host. This process of re-using the selected set of tags to stage the write-data facilitates the large write command in a memory efficient manner.

Dynamically allocating part of the semiconductor memory 7 relative to its allocation state and re-using the memory in an efficient manner improves performance of the disk drive by preserving the read and write caches. Instead of allocating a block of memory equal to the size of a large read or write command, which may decimate the read cache or require the dirty writes to be flushed, the large read or write command is processed in segments using a more optimal, dynamically allocated block of memory that is re-used in an overlapping manner while interfacing with the host and the disk.

I claim:

1. A disk drive comprising:
   (a) a disk;
   (b) a head actuated radially over the disk;
   (c) a semiconductor memory comprising addressable locations for staging and caching data, wherein each addressable location having an allocation status; and
   (d) a disk controller for:
      receiving a write command from a host to write write-data to the disk, the write-data comprising a first segment, a second segment and a third segment;
      dynamically allocating a plurality of the addressable locations relative to the size of the write command and the allocation status of the addressable locations;
      receiving the first segment of write-data from the host and storing the first segment of write-data in the dynamically allocated addressable locations;
      receiving the second segment of write-data from the host and storing the second segment of write-data in the dynamically allocated addressable locations while concurrently reading the first segment of write-data from the dynamically allocated addressable locations and writing the first segment of write-data to the disk; and
      re-using the dynamically allocated addressable locations for storing the third segment of write-data received from the host after writing the first segment of write-data to the disk.

2. The disk drive as recited in claim 1, wherein:
   (a) the addressable locations for staging read-data to facilitate read commands;
   (b) the disk controller for:
      receiving a read command from the host to read read-data from the disk, the read-data comprising a first segment, a second segment and a third segment;
      dynamically allocating a plurality of the addressable locations relative to the size of the read command and the allocation status of the addressable locations;
      reading the first segment of read-data from the disk and storing the first segment of read-data in the dynamically allocated addressable locations;
      reading the second segment of read-data from the disk and storing the second segment of read-data in the dynamically allocated addressable locations while concurrently reading the first segment of read-data from the dynamically allocated addressable locations and transmitting the first segment of read-data to the host; and
      re-using the dynamically allocated addressable locations for storing the third segment of read-data read from the disk after transmitting the first segment of read-data to the host.

3. The disk drive as recited in claim 2, wherein:
   (a) the allocation status is assigned a value selected from the group consisting of free, available, valid, and dirty;
   (b) the free allocation status indicates an addressable location is not allocated;
   (c) the available allocation status indicates an addressable location stores cached write-data written to the disk and therefore available for re-allocation;
   (d) the valid allocation status indicates an addressable location stores cached read-data that can be selectively re-allocated; and
   (e) the dirty allocation status indicates an addressable location stores staged write-data not yet written to the disk and therefore not available for re-allocation.

4. The disk drive as recited in claim 3, wherein when dynamically allocating the plurality of addressable locations:
   (a) the disk controller dynamically allocates addressable locations having a free allocations status first;
   (b) the disk controller dynamically allocates addressable locations having an available allocation status second; and
   (c) the disk controller dynamically allocates addressable locations having a valid allocation status third.

5. The disk drive as recited in claim 4, wherein before dynamically allocating all of the addressable locations having a valid allocation status, the disk controller writes at least part of the staged write-data to the disk, changes the corresponding addressable locations from a dirty allocation status to an available allocation status, and dynamically allocates the addressable locations updated to the available allocation status.

6. The disk drive as recited in claim 4, wherein when the disk controller dynamically allocates the addressable locations having a valid allocation status, the disk controller selects the addressable locations storing the least recently used cached read-data.

7. The disk drive as recited in claim 3, wherein the number of addressable locations dynamically allocated by the disk controller increases with the number of addressable locations having a free allocation status and an available allocation status.

8. A method of processing host commands in a disk drive, the disk drive comprising a disk, a head actuated radially over the disk, a semiconductor memory comprising addressable locations for staging and caching data, wherein each addressable location having an allocation status, the method comprising the steps of:
   (a) receiving a write command from a host to write write-data to the disk, the write command comprising a first segment, a second segment and a third segment;
   (b) dynamically allocating a plurality of the addressable locations relative to the size of the write command and the allocation status of the addressable locations;
   (c) receiving the first segment of write-data from the host and storing the first segment of write-data in the dynamically allocated addressable locations;
   (d) receiving the second segment of write-data from the host and storing the second segment of write-data in the dynamically allocated addressable locations while concurrently reading the first segment of write-data from the dynamically allocated addressable locations and writing the first segment of write-data to the disk; and
   (e) re-using the dynamically allocated addressable locations for storing the third segment of write-data received from the host after writing,the first segment of write-data to the disk.

9. The method as recited in claim 8, wherein the addressable locations for staging read-data to facilitate read commands, the method further comprising the steps of:
   (a) receiving a read command from the host to read read-data from the disk, the read-data comprising a first segment, a second segment, and a third segment;
   (b) dynamically allocating a plurality of the addressable locations relative to the size of the read command and the allocation status of the addressable locations; and (c) reading the first segment of read-data from the disk and storing the first segment of read-data in the dynamically allocated addressable locations;

(d) reading the second segment of read-data from the disk and storing the second segment of read-data in the dynamically allocated addressable locations while concurrently reading the first segment of read-data from the dynamically allocated addressable locations and transmitting the first segment of read-data to the host; and (e) re-using the dynamically allocated addressable locations for storing the third segment of read-data read from the disk after transmitting the first segment of read-data to the host.

10. The method as recited in claim 9, wherein:

(a) the allocation status is assigned a value selected from the group consisting of free, available, valid, and dirty;

(b) the free allocation status indicates an addressable location is not allocated;

(c) the available allocation status indicates an addressable location stores cached write-data written to the disk and therefore available for re-allocation;

(d) the valid allocation status indicates an addressable location stores cached read-data that can be selectively re-allocated; and (e) the dirty allocation status indicates an addressable location stores staged write-data not yet written to the disk and therefore not available for re-allocation.

11. The method as recited in claim 10, wherein when dynamically allocating the plurality of addressable locations:

(a) the addressable locations having a free status are dynamically allocated first;

(b) the addressable locations having an available status are dynamically allocated second; and (c) the addressable locations having a valid status are dynamically allocated third.

12. The method as recited in claim 11, wherein before dynamically allocating all of the addressable locations having a valid allocation status, at least part of the staged write-data is written to the disk, the corresponding addressable locations are changed from a dirty allocation status to an available allocation status, and the addressable locations updated to the available allocation status are dynamically allocated.

13. The method as recited in claim 11, wherein when allocating addressable locations having a valid allocation status, further comprising the step of selecting the addressable locations storing the least recently used cached read-data.

14. The method as recited in claim 10, wherein the number of addressable locations dynamically allocated increases with the number of addressable locations having a free allocation status and an available allocation status.

* * * * *